US008533432B2

(12) United States Patent
Satish et al.

(10) Patent No.: US 8,533,432 B2
(45) Date of Patent: Sep. 10, 2013

(54) CACHE AND/OR SOCKET SENSITIVE MULTI-PROCESSOR CORES BREADTH-FIRST TRAVERSAL

(71) Applicants: Nadathur Rajagopalan Satish, Santa Clara, CA (US); Changkyu Kim, San Jose, CA (US); Jatin Chhugani, Santa Clara, CA (US); Jason D. Sewall, Santa Clara, CA (US)

(72) Inventors: Nadathur Rajagopalan Satish, Santa Clara, CA (US); Changkyu Kim, San Jose, CA (US); Jatin Chhugani, Santa Clara, CA (US); Jason D. Sewall, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/629,087

(22) Filed: Sep. 27, 2012

(65) Prior Publication Data

US 2013/0086354 A1 Apr. 4, 2013

(30) Foreign Application Priority Data

Sep. 29, 2011 (US) .............................. 2011/054016

(51) Int. Cl.
*G06F 9/38* (2006.01)
*G06F 9/06* (2006.01)
*G06F 15/80* (2006.01)
*G06F 13/14* (2006.01)

(52) U.S. Cl.
USPC ............................................. 712/17; 712/13

(58) Field of Classification Search
None
See application file for complete search history.

(56) References Cited

U.S. PATENT DOCUMENTS

| 6,374,403 | B1* | 4/2002 | Darte et al. ................... 717/161 |
| 6,421,809 | B1* | 7/2002 | Wuytack et al. .............. 716/132 |
| 6,426,750 | B1* | 7/2002 | Hoppe ........................... 345/428 |
| 6,438,747 | B1* | 8/2002 | Schreiber et al. ............. 717/160 |
| 7,647,585 | B2 | 1/2010 | Sun |
| 7,827,182 | B1 | 11/2010 | Panigrahy |
| 7,870,337 | B2* | 1/2011 | Bell et al. ....................... 711/118 |
| 2008/0040553 | A1 | 2/2008 | Ash et al. |
| 2008/0256339 | A1* | 10/2008 | Xu et al. ........................ 712/216 |
| 2008/0282244 | A1* | 11/2008 | Wu et al. ........................ 718/100 |
| 2010/0211753 | A1* | 8/2010 | Ylonen .......................... 711/165 |

OTHER PUBLICATIONS

Scarpazza, D.P., etal., Efficient Breadth-First Search on the Cell/BE Processor, 2008, IEEE, IEEE transactions on Parallel and Distributed Systems, vol. 19, No. 10, pp. 1381-1395.*
Bakhoda, Ali, etal., Analyzing CUDA Workloads Using a Detailed GPU Simulator, 2009, IEEE, pp. 163-174.*
Gokhale, M. etal., Hardware Technologies for High-Performance Data-Intensive Computing, 2008, IEEE, pp. 60-68.*
International Search Report mailed Jun. 28, 2012 in International Application No. PCT/US2011/054016, 9 pages.
Agarwal, V. et al. Scalable Graph Exploration on Multicore Processors, In: 2010 International Conference for High Performance Computing Networking, Storage and Analysis (SC), Nov. 13-19, 2010, 11 pages.

* cited by examiner

*Primary Examiner* — Eric Coleman
(74) *Attorney, Agent, or Firm* — Schwabe, Williamson & Wyatt, P.C.

(57) ABSTRACT

Methods, apparatuses and storage device associated with cache and/or socket sensitive breadth-first iterative traversal of a graph by parallel threads, are described. A vertices visited array (VIS) may be employed to track graph vertices visited. VIS may be partitioned into VIS sub-arrays, taking into consideration cache sizes of LLC, to reduce likelihood of evictions. Potential boundary vertices arrays (PBV) may be employed to store potential boundary vertices for a next iteration, for vertices being visited in a current iteration. The number of PBV generated for each thread may take into consideration a number of sockets, over which the processor cores employed are distributed. The threads may be load balanced; further data locality awareness to reduce inter-socket communication may be considered, and/or lock-and-atomic free update operations may be employed.

35 Claims, 7 Drawing Sheets

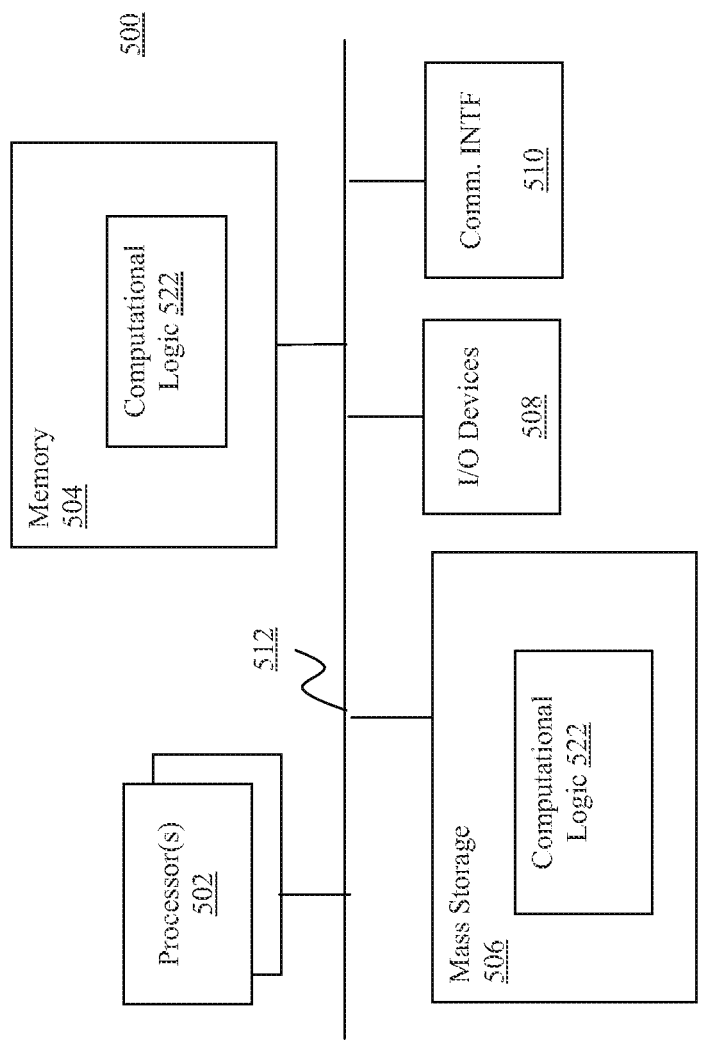

US 8,533,432 B2

CACHE AND/OR SOCKET SENSITIVE MULTI-PROCESSOR CORES BREADTH-FIRST TRAVERSAL

RELATED APPLICATIONS

The present application claims priority under 35 U.S.C. §365(a) to International Application No. PCT/US2011/054016, filed Sep. 29, 2011, entitled "Cache And/Or Socket Sensitive Multi-Processor Cores Breadth-First Traversal", which designates the United States of America. The entire contents and disclosure of which is hereby incorporated by reference in its entirety.

TECHNICAL FIELD

This application relates to the technical field of data processing, more specifically to methods and apparatuses associated with cache and/or socket sensitive multi-processor cores breadth-first traversal of a graph for a breadth-first search.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Conventional breadth-first traversal methods for traversing a graph for a breadth-first search typically employ a small-sized auxiliary structure, such as a bit-vector, which is assumed to fit in a last level cache (LLC) to check whether a vertex has already been assigned a depth, to reduce external memory traffic. Further, the conventional methods typically employ atomic operations to avoid race conditions. However, as the graph size increases, the assumption that the bit-vector will fit the LLC may no longer be correct. Once the size of the bit-vector is larger than the LLC size, performance of conventional methods tends to degenerate. Additionally, the use of atomic operations may lead to increased latency in computation.

Further, with advances in integrated circuit technology, increasing number of processor cores are being integrated into a processor, offering substantial increase in computing capability. In turn, powerful computing systems with multiple multi-core processors are being built. Typically, the multi-core processors are distributed over a number of sockets. As a result, performance gains through parallel execution by multiple processor cores may be offset by the latency incurred by inter-socket communications.

BRIEF DESCRIPTION OF THE DRAWINGS

Embodiments of the present invention will be described by way of exemplary embodiments, but not limitations, illustrated in the accompanying drawings in which like references denote similar elements, and in which:

FIG. 7 illustrates an example computing environment; all arranged in accordance with embodiments of the present disclosure.

DETAILED DESCRIPTION

Figure 1:
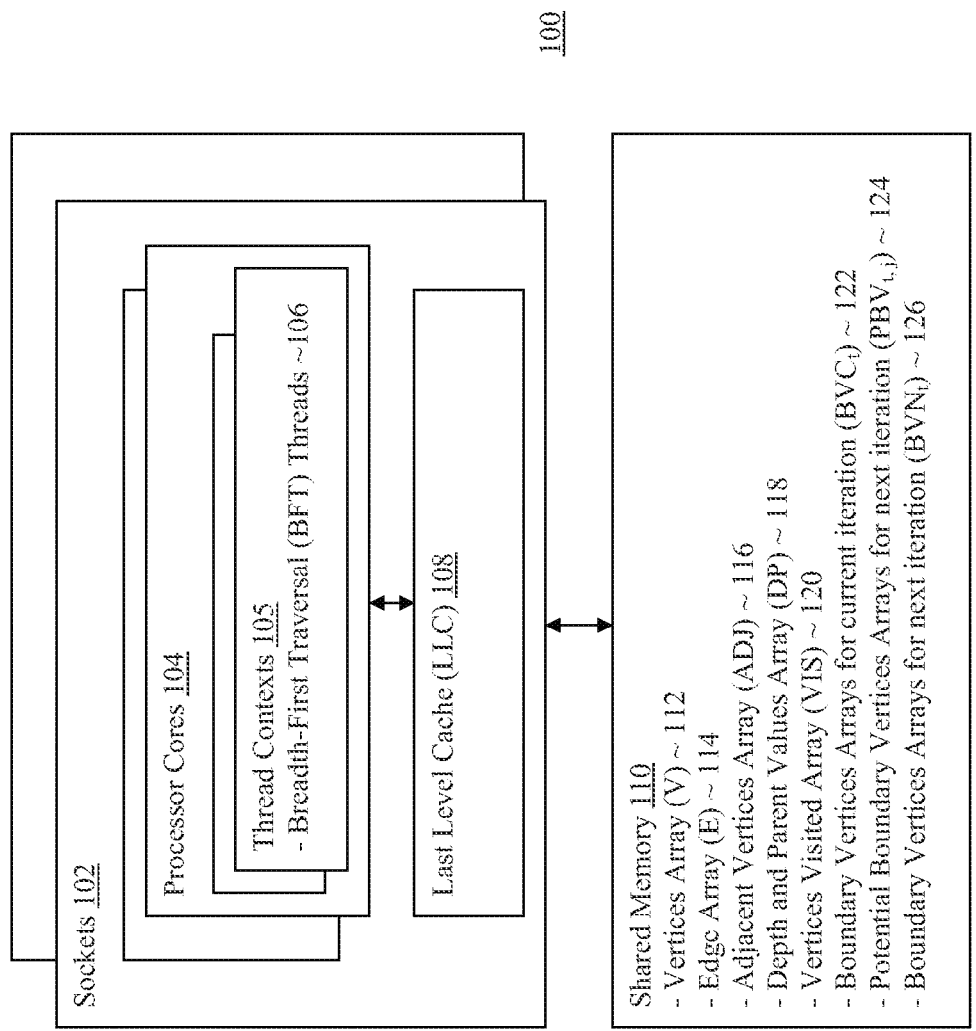
FIG. 1 is a block diagram illustrating an example computing arrangement configured to practice a cache and/or socket sensitive multi-processor cores breadth-first traversal of a graph.

Embodiments of methods, apparatuses and storage device associated with cache and/or socket sensitive multi-processor cores breadth-first traversal, are disclosed herein. In various embodiments, a vertices visited array (VIS) may be employed to track visited vertices of a graph to be breadth-first traversed by a number of threads executed by a number of processor cores. The processor cores may be associated with one or more last level caches (LLC) having respective cache size(s). The VIS may be partitioned into a number of VIS sub-arrays on a cache sensitive basis, e.g., with the VIS sub-arrays having sub-array sizes that are smaller than the cache sizes of the LLC the VIS sub-arrays are cached by respective amount(s) to reduce likelihood of eviction of any of the sub-arrays from the LLC during traversal of the graph. In various embodiments, the VIS array may be partitioned into a number of VIS sub-arrays where the sub-array sizes are respectively less than half of the cache sizes of the LLC. The LLC may have the same cache size. Similarly, the sub-arrays may also have the same sub-array size. The VIS sub-arrays may be initialized in a shared memory of the processor cores.

Further, after the partition, the threads may successively traverse different breadth spans of the graph in a number of iterations, one breadth span during each iteration, and the threads traversing different portions of a breadth span of the graph in parallel, respectively using different ones of the VIS sub-arrays. Additionally, lock-and-atomic free operations may be employed to update depth and parent values of the vertices of the different portions visited.

In various embodiments, the threads may also initialize, e.g., in a shared memory, prior to the breadth-first traversal of the graph, an adjacent vertices array (ADJ) to store adjacent vertices of the vertices of the graph, or a depth and parent values array (DP) to store depth and parent values of the vertices of the graph. Initializing, may also include initializing, e.g., in the shared memory, a number of current iteration boundary vertices arrays ($BVC_t$), one per thread, to store boundary vertices being respectively traversed by the threads during a current iteration of the breadth-first traversal, or a number of next iteration boundary vertices arrays ($BVN_t$), one per thread, to store boundary vertices to be traversed by the threads during a next iteration of the breadth-first traversal.

Additionally, the threads may determine, prior to the breadth-first traversal of the graph, a number (npbv) of potential boundary vertices arrays ($PBV_{t,j}$) to be initialized, for each thread, and initializing the $PBV_{t,j}$, e.g., in the shared memory. The $PBV_{t,j}$ may be initialized to be used to store and bin potential boundary vertices of the vertices being visited during an iteration of the breadth-first traversal. The determination of npbv may be based at least in part on ns and the partitioning of the VIS, and j is an integer between 1 and npbv.

In various embodiments, the breadth-first traversal may be practiced employing the $PBV_{t,j}$ as described, without the partitioning of the VIS being cache sensitive.

In various embodiments, the threads may retrieve respectively, neighbor vertices of a number of boundary vertices of a current iteration, with each thread retrieving neighbor vertices of a corresponding set of boundary vertices, and generate respectively, a number of potential boundary vertices arrays, based at least in part on the corresponding retrieved neighbor vertices. Further, the threads may retrieve respectively, parent vertices for vertices in the potential boundary vertices arrays, correspondingly responsible by the threads. The threads may update respectively, depth and parent values in a depth and parent value array for vertices of the graph respectively visited, using lock-and-atomic free operations, including updating the corresponding VIS sub-arrays. The threads may also respectively add boundary vertices in corresponding sets of boundary vertices for a next iteration, based at least in part on the corresponding potential boundary vertices.

In various embodiments, subsets of the plurality of boundary vertices of a current iteration may be respectively stored in a number of current iteration boundary vertices arrays ($BVC_t$) correspondingly associated with the threads. Further, subsets of the boundary vertices of a next iteration may be initially stored in a number of next iteration boundary vertices arrays ($BVN_t$) correspondingly associated with the threads. The threads may determine respectively, at an end of a iteration, whether the corresponding ($BVN_t$) are empty. Additionally, the threads may swap corresponding $BVC_t$ and the $BVN_t$, if at least one of the $BVN_t$ is determined to be non-empty, and after the swapping, enter the next iteration. On entry into the next iteration, with the previous next iteration becoming a new current iteration, the threads may repeat retrieval of neighboring vertices, generation of the various data structures, retrieval of parent vertices, and updates/addition to the various data structures.

In various embodiments, the processor cores may be distributed on a number (ns) of sockets, and the LLC may be correspondingly associated with the sockets. For these embodiments, the BVC and the PBV may be divided among threads to load balance among the threads, before their employment. The toad balancing may be on a socket sensitive basis, including data locality awareness to reduce inter-socket communication for data access. Similarly, after each iteration, the BVN may likewise be re-arranged to load balance the threads, and the load balancing may include data locality awareness to reduce inter-socket communication for data access.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Referring now to FIG. 1, wherein a block diagram illustrating a computing arrangement configured to practice cache and/or socket sensitive multi-processor cores breadth-first traversal of a graph, in accordance with various embodiments of the present disclosure, is shown. As illustrated, computing arrangement 100 may include a number of processor cores 104 configured with a number of hardware thread contexts 105 to execute a number of threads 106 in parallel. Threads 106 may be configured to collectively practice embodiments of the cache and/or socket sensitive breadth-first traversal of a graph of the present disclosure, for a breadth-first search (BFS). In various embodiments, each processor core 104 may execute one or more threads 106 in parallel.

In various embodiments, every two or more processor cores 104 may be integrated and packaged as a multi-cores processor (not shown), and mated with a socket 102. In other words, processor cores may be distributed or located over one or more sockets 102. An example of a multi-cores processor may be the Xeon X5570 CPU available from Intel® Corporation of Santa Clara, Calif. Further, computing arrangement 100 may have shared memory 110 coupled to processor cores 104 via at least last level caches (LLC) 108, correspondingly associated with socket 102. LLC 108 may have the same or different cache sizes. Between LLC 108 and shared memory 110, computing arrangement 100 may further include one or more levels of intermediate caches (now shown). LLC 108, intermediate level caches, if any, and shared memory 110 may be any suitable cache/memory storage devices from any one of a number of cache/memory manufacturers, e.g., Micron Technologies of Boise, Id., Samsung Electronics of Seoul, Korea, and so forth.

Continuing to refer to FIG. 1, in various embodiments, threads 106 may have the following associated data structures:

Vertices Array (V) 112 configured to store vertices of a graph to be breadth-first traversed for a breadth-first search;

Edge Array (E) 114 configured to store the edges for the connected vertices of the graph;

Adjacent Vertices Array (ADJ) 116 configured to store the neighbor vertices of the vertices;

Depth and Parent Values Array (DP) 118 configured to store the depth and parent values of the vertices;

Vertices Visited Array (VIS) 120 configured to track the vertices visited during traversal of the graph;

Boundary Vertices Arrays for current iteration ($BVC_t$) 122 configured to store boundary vertices for a current iteration of the traversal;

Potential Boundary Vertices Arrays for next iteration ($PBV_{t,j}$) 124 configured to store potential boundary vertices for a next iteration of the traversal; and Boundary Vertices Arrays for next iteration ($BVN_t$) 126 store boundary vertices for a next iteration of the traversal.

As will be described in more detail below, VIS may be partitioned into VIS sub-arrays on a cache and/or socket sensitive basis. $BVC_t$ and $BVN_t$ may be maintained on a per thread basis. $PBV_t$ may be maintained on a per thread, as well as socket sensitive basis, including load balancing and/or data locality awareness to reduce inter-socket communication for data access. Further, these data structures may be allocated and initialized in shared memory 110 prior to traversal of the graph of interest. The allocation and initialization may be performed by one or more of the threads 106. If performed by one thread 106, the thread may be a dedicated control thread. Collectively, as experience has shown, these practices may provide improved performance for breadth-first traversal of a graph for performing a breadth-first search.

Figure 2:
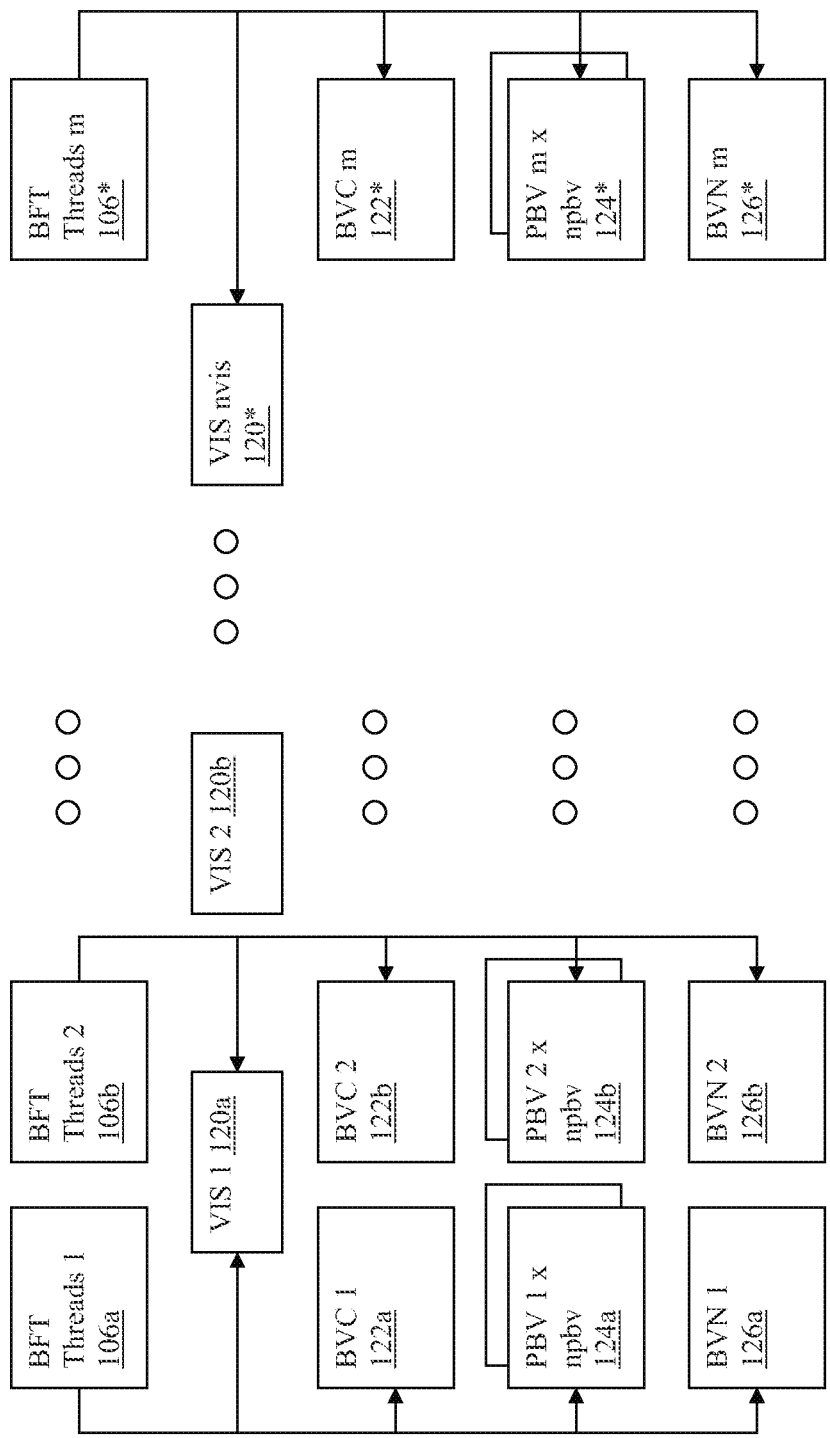
FIG. 2 illustrates the relationships between the various threads, VIS sub-arrays, $BVC_t$, $PBV_{t,j}$ and $BVN_t$ of FIG. 1 in further detail.

Referring now to FIG. 2, wherein the correspondence between threads 106 and some of the data structures 120-126 are illustrated in further detail, in accordance with various embodiments of the present disclosure. As shown, various embodiments may include m threads being executed in parallel by np number of processor cores distributed/located on ns number of sockets. M, np and ns may be integers, greater than or equal to 1. In various embodiments, ns equals 2, np equals 4 (2 processor cores per processor/socket), and m equals 8 (2 threads per processor core).

To facilitate efficient parallel operation, as alluded to earlier, VIS 120 may be partitioned in a cache sensitive basis into nvis number of VIS sub-arrays 120a-120*. (The * denotes an alphabet or a combination of alphabets for uniquely denoting a VIS sub-array). In various embodiments, nvis may be sufficiently large such that the sub-array size of each VIS sub-array may be less than the corresponding LLC 108 by a predetermined amount, such as, half of LLC 108, to reduce the likelihood of a VIS sub-array being evicted from a LLC 108 during traversal operation. For example, if the number of vertices (|V|) of a graph to be traversed is 256M, the size of VIS (|VIS|) may be 256 m/8 bytes, i.e., 32 MB. And if the cache size (|C|) of each LLC 108 is 16 MB, VIS may be partitioned into nvis=4 VIS sub-arrays, such that the sub-array size of each VIS sub-array is 8 MB, half of the LLC cache size.

Additionally, correspondingly associated with m threads 106a-106* may be m $BVC_t$ 122a-122*, and m $BVN_t$ 126a-126*, one each, per thread, as alluded to earlier (with the * having similar connotation as earlier described). Further, associated with each thread 106* may be npbv number of $PBV_{t,j}$ 124a-124*, where npbv and j are integers, with j=1, . . . npbv, and npbv selected on a socket sensitive basis, including load balancing and/or data locality awareness to reduce inter-socket communication for data access. In various embodiments, npbv may be selected to equal to ns×nvis (ns being the number of socket, and nvis being the number of VIS sub-arrays, as described earlier). For example, if nvis equals 4, and ns equals 2, npbv may be set to 8.

Figure 3:
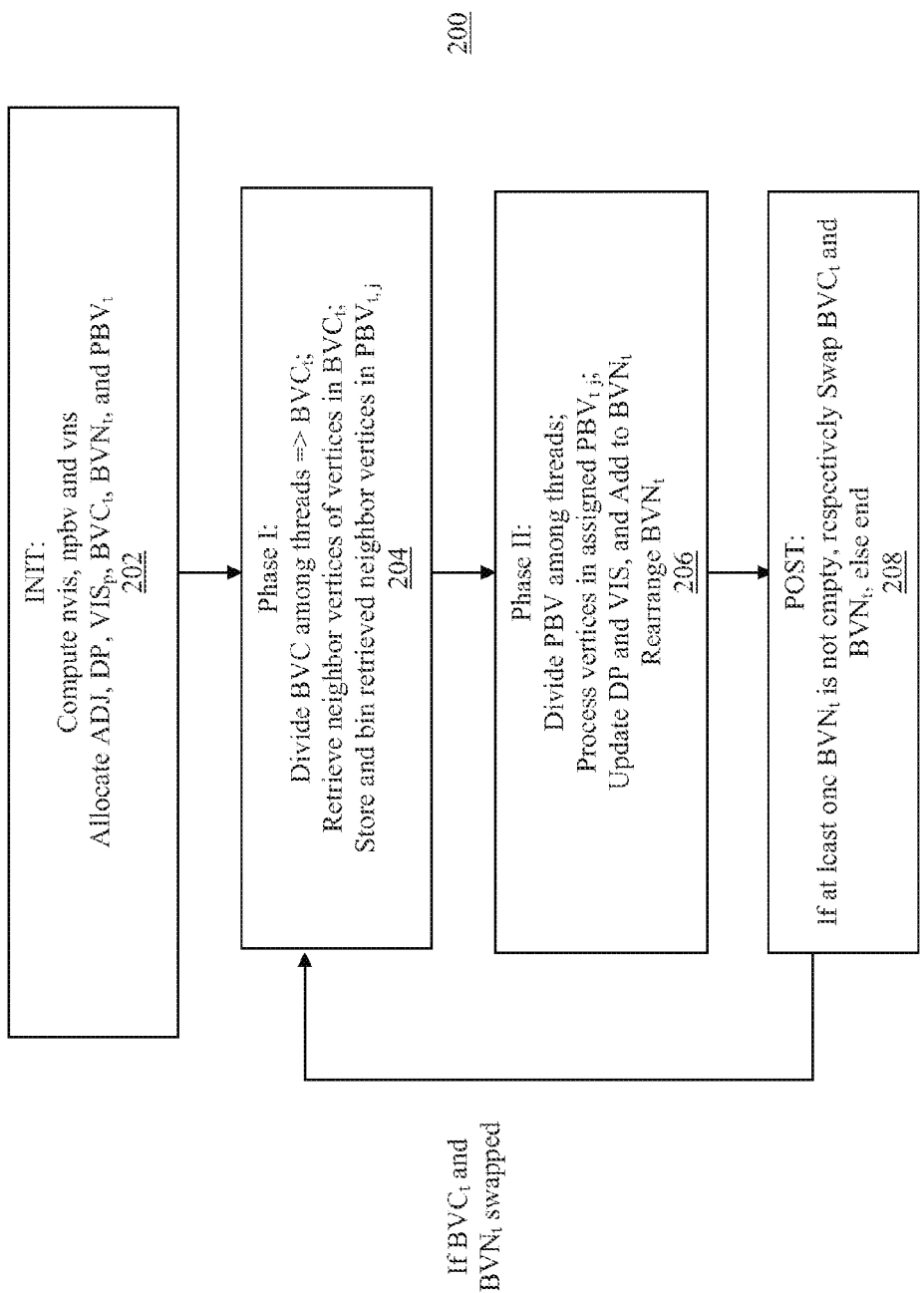
FIG. 3 illustrates the cache and/or socket sensitive multi-processor core breadth-first traversal method in further detail.

Referring now to FIG. 3, wherein a cache and/or socket sensitive multi-processor cores breadth-first traversal method, in accordance with various embodiments, is illustrated. As shown, in various embodiments, method 200 may start with a number of initialization operations 202 performed prior to the traversal of a graph of interest, by one or more threads 106. As described earlier, initialization operations 202 may be performed by a control thread. For the illustrated embodiments, initialization operations 202 may include computation of nvis, number of VIS sub-arrays VIS to be partitioned into, as described earlier. For embodiments with multiple sockets, initialization operations 202 may further include computation of npbv, number of potential boundary arrays for each thread, as described earlier, and vns, number of vertices to be assigned to each socket. In various embodiments, except for the "last" socket, the first ns−1 socket may be assigned |V|/ns vertices rounding up to next integer that is power of 2 integer. The "last" socket may be assigned the remaining number of vertices, if the number of vertices of the graph to be traversed is not a power of 2 integer. For example, if the graph to be traversed has 125M vertices, and there are 2 sockets, the first socket may be assigned 64 m, and the second ("last") socket may be assigned 61 m vertices. It should be noted that the references to the sockets as the first ns−1 socket and the "last" socket are arbitrary, for ease of description and understanding only. In general, and for assignment of vertices in particular, the sockets have no order significance. However, it is convenient to refer to the multiple sockets as socket_1, socket_2, . . . socket_ns. Similarly, it is convenient to refer to the processor cores as core_1, core_2 . . . core_np, and the threads as thread_1, thread_2, . . . thread_m. The data structures allocated on a per thread may be referred to as the corresponding data structures of the threads.

Still referring to FIG. 3, as shown, initialization operations 202 may further include allocating and initializing adjacent vertices array (ADJ) 116, depth and parent value array (DP) 118, boundary vertices of current iteration arrays ($BVC_t$) 122, boundary vertices of current iteration arrays ($BVN_t$) 126, and potential boundary vertices arrays ($PBV_{t,j}$) 124. Additionally, as described earlier, initialization operations 202 may further include allocating, partitioning and initializing the VIS sub-arrays 120. In various embodiments, initializations of the various data structures, ADJ 116, DP 118 et al, may take into considerations load balancing among the threads, as well as data locality awareness, to reduce inter-socket communication for data access.

From block 202, method 200 may proceed to block 204 to perform a number of Phase I traversal operations, for a traversal iteration traversing a breadth span of the graph. In various embodiments, Phase I operations 204 may begin with dividing boundary vertices of the current iteration (BVC) into $BVC_t$ of threads 106 to balance the workload among the threads (and to reduce inter-socket communication for embodiments where threads are executed by processor cores distributed on multiple sockets). The dividing may be performed cooperatively by the threads, by one of threads, or a dedicated control thread. Further, Phase I operations 204 may include respectively retrieving, by the threads, neighbor vertices for vertices in $BVC_t$, and on retrieval, respectively storing and binning, by the threads, the retrieved vertices into the corresponding $PBV_{t,j}$. The respective retrieving and storing/binning operations may be performed by threads 106, in parallel.

From block 204, method 200 may proceed to block 206 to perform a number of Phase II traversal operations, for the traversal iteration traversing the same breadth span of the graph. In various embodiments, threads 106 may sync up, awaiting completion of all Phase I operations by all threads 106, before proceeding to perform Phase II operations 206. In various embodiments, Phase II operations 206 may begin with dividing potential boundary vertices of the current iteration (PBV) into $PBVC_{t,j}$ of threads 106 to balance the workload among the threads (and to reduce inter-socket communication for embodiments where threads are executed by processor cores distributed on multiple sockets). The dividing may be performed cooperatively by the threads, by one of threads, or a dedicated control thread. Further, Phase II operations 206 may include processing the vertices in the assigned $PBV_{t,j}$, by threads 106, in parallel. The processing may include respectively updating DP 118, and corresponding VIS sub-arrays 120, and respectively adding vertices to be examined in the next traversal iteration of another breadth-span of the graph in corresponding $BVN_t$, by threads 106, in parallel. Additionally, after the updating and adding operations, Phase II operations 206 may include rearranging boundary vertices of the next iteration (BVN) into $BVN_t$ of threads 106 to balance the workload among the threads (and to reduce inter-socket communication for embodiments where threads are executed by processor cores distributed on multiple sockets). The re-arranging may be performed cooperatively by the threads, by one of threads, or a dedicated control thread.

In various embodiments, unlike the prior art, the respective updating of DP 118 and corresponding VIS sub-arrays 120 may be performed using lock-and-atomic free operations. In various embodiments, processor cores 104 may guarantee atomic read/write at least at a byte (8-bits) granularity. For these embodiments, when multiple threads 106 want to simultaneously update the same bit in a VIS sub-array 120* to indicate the corresponding vertex has been visited, the corresponding bit in the VIS sub-array 120* will eventually be set to 1, as visited. All threads 106 would also update the depth of the corresponding vertex. Since all threads 106 are executing at the same traversal iteration at the same time, threads 106 would end up assigning the same depth (with potential different parent vertices) to the vertex. The traversal will be valid and correct. Multiple threads 106 may also want to simultaneously update different bits that fall within the same 8-bit granularity. It is possible that the bit corresponding to all but one of the vertices being accessed may not be set to 1, while the depth for all the vertices would have been updated. To ensure correctness, in case the access of a VIS sub-array for a certain vertex returns a value of 0, the value is set to 1, but update the depth (and parent) and append that vertex to $BVN_t$ only if the stored depth has not been updated so far. Using 8/16/32/64-bits to represent the depth and parent values ensures that the updates are always consistent. Accordingly, a bit value of 0 in the VIS sub-arrays 120 implies that the depth of the corresponding vertex may possibly have been updated, while bit value of 1 implies that the depth of the corresponding vertex has definitely been updated. It is not possible for a bit in the VIS sub-arrays 120 to be set to 1, while the depth of the corresponding vertex has not been updated at the end of a traversal iteration.

From block 206, method 200 may proceed to block 208 to perform a number of post iteration operations. In various embodiments, threads 106 may sync up, awaiting completion of all Phase II operations by all threads 106, before proceeding to perform post iteration operations 204. Post iteration operations 206 may include determining whether the corresponding $BVN_t$ are empty. If the corresponding $BVN_t$ of all threads 106 are empty, method 200 may terminate. If at least one $BVN_t$ of a thread 106* is non-empty, the $BVN_t$ of threads 106 are respectively swapped with the corresponding $BVC_t$ of the threads 106 to become the $BVC_t$ of the next traversal iteration of threads 106, of another breadth-span of the graph. Thereafter, method 200 proceeds back to block 204. From block 204, method 200 proceeds as earlier described, until eventually, all $BVN_t$ are empty. At such time threads 106 terminate their operations.

Figure 4:
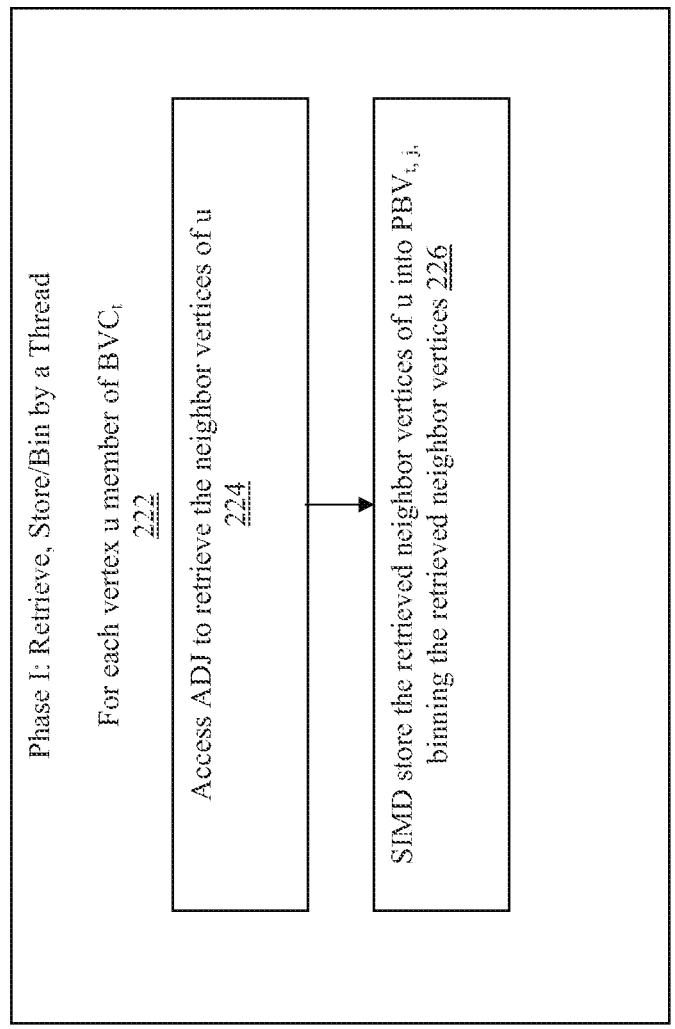
FIG. 4 illustrates selected Phase I operations of FIG. 3 for a traversal iteration, in further detail.

Referring now to FIG. 4, wherein selected Phase I operations 204 of FIG. 3 for a traversal iteration traversing a breadth-span of the graph are illustrated in further detail, in accordance with various embodiments. FIG. 4 illustrates the retrieve and store/bin Phase I operations 204 as performed by a thread 106*. As shown, at 222, for a vertex u, a member of the $BVC_t$ 122* of the thread 106*, thread 106* accesses 224 ADJ to retrieve the neighbor vertices of u. On retrieval of the neighbor vertices of u, for the embodiments, thread 106* uses a single instruction multi data (SIMD) instruction to store and bin 226 the retrieved neighbor vertices into the corresponding $PBV_{t,j}$ of thread 106*. In various embodiments, operations 224 and 226 may be repeated for each vertex u, a member of the thread's $BVC_t$ 122*, until operations 224 and 226 have been performed for all members of the thread's $BVC_t$ 122*.

Figure 5:
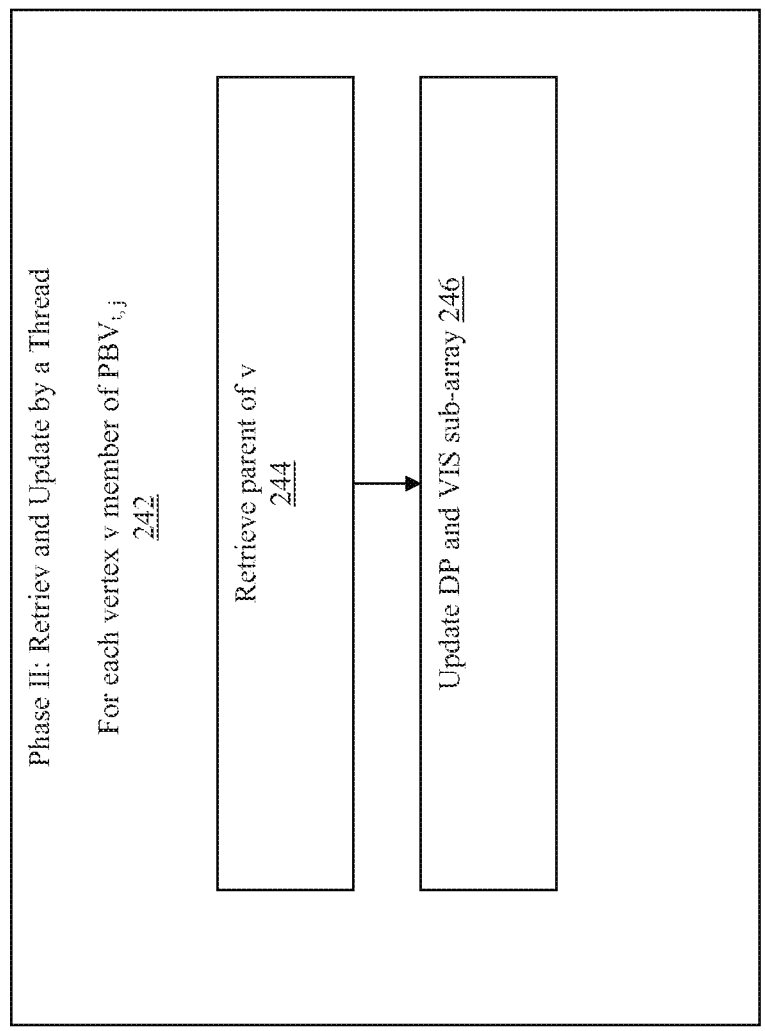
FIG. 5 illustrate selected Phase II operations of FIG. 3 for a traversal iteration in further detail.

Referring now to FIG. 5, wherein selected Phase II operations of FIG. 3 for a traversal operation traversing a breadth span of a graph are illustrated in further detail, in accordance with various embodiments. As FIG. 4, FIG. 5 illustrates the retrieve and update Phase II operations 206 as performed by a thread 106*. As shown, at 242, for a vertex v, a member of the $PBV_{t,j}$ 124* of the thread 106*, thread 106* accesses 244 V to retrieve a parent of v. On retrieval of the parent v, for the embodiments, thread 106* uses lock-and-atomic free operations to update 246 DP and the corresponding VIS sub-array of thread 106*. In various embodiments, operations 244-246 may be repeated for each vertex v, a member of the thread's $PBV_{t,j}$ 124*, until operations 244-246 have been performed for all members of the thread's $PBV_{t,j}$ 124*.

Figure 6:
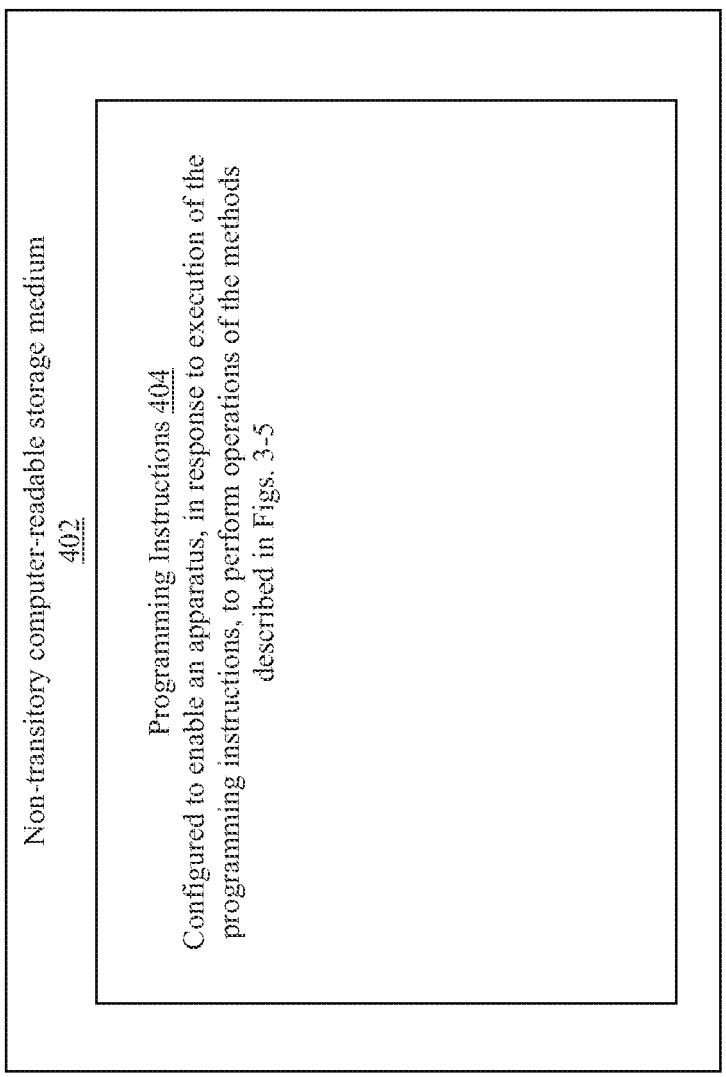
FIG. 6 illustrates an example non-transitory computer-readable storage medium having instructions configured to practice all or selected aspects of the method of FIGS. 3-5.

FIG. 6 illustrates a non-transitory computer-readable storage medium, such as a storage device, in accordance with various embodiments of the present disclosure. As illustrated, non-transitory computer-readable storage medium 402 may include a number of programming instructions 404. Programming instructions 404 may be configured to enable an apparatus, in response to execution of the programming instructions, to perform operations of some or all aspects of method 200 earlier described with references to FIGS. 3-5.

FIG. 7 illustrates an example computer system suitable for use as a computing node or the control node in accordance with various embodiments of the present disclosure. As shown, computing system 500 includes a number of processors or processor cores 502, and system memory 504. For the purpose of this application, including the claims, the terms "processor" and "processor cores" may be considered synonymous, unless the context clearly requires otherwise. Additionally, computing system 500 includes mass storage devices 506 (such as diskette, hard drive, compact disc read only memory (CD-ROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing method 200 earlier described with references to FIGS. 3-5, or portions thereof, herein collectively denoted as, computational logic 522. The various components may be implemented by assembler instructions supported by processor(s) 502 or high-level languages, such as, for example, C, that can be compiled into such instructions.

The permanent copy of the programming instructions may be placed into mass storage 506 in the factory, or in the field, through, for example, a distribution medium (not shown), such as a compact disc (CD), or through communication interface 510 (from a distribution server (not shown)). That is, one or more distribution media having an implementation of computational logic 522 may be employed to distribute computational logic 522 to program various computing devices.

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. At least one non-transitory computer-readable storage device having a plurality of instructions configured to enable a plurality of threads of an apparatus, in response to execution of a plurality of instances of the instructions by a plurality of processor cores of the apparatus, to:

partition a vertices visited array (VIS) into a plurality of VIS sub-arrays, wherein the VIS is to be employed by the threads to track visited vertices of a graph to be breadth-first traversed by the threads, wherein the processor cores are associated with one or more last level caches (LLC) having respective cache size(s) employed to cache the VIS sub-arrays during traversal of the graph; and wherein the VIS sub-arrays have sub-array sizes that are smaller than the cache sizes of the LLC the VIS sub-arrays are cached by respective amount(s) to reduce likelihood of eviction of any of the sub-arrays from the LLC during traversal of the graph; and breadth-first traverse the graph, after the partition, with the threads successively traversing different breadth spans of the graph in a plurality of iterations, one breadth span during each iteration, wherein the threads traverse different portions of a breadth span of the graph in parallel, respectively using different ones of the VIS sub-arrays, and lock-and-atomic free operations to update depth and parent values of the vertices of the different portions visited.

2. The storage device of claim 1, wherein the instructions are configured to enable the threads of the apparatus, in response to said execution, to partition the VIS into the VIS sub-arrays where the sub-array sizes are respectively less than half of the cache sizes of the LLC.

3. The storage device of claim 1, wherein the instructions are further configured to enable the threads of the apparatus, in response to said execution, to initialize the VIS sub-arrays in a shared memory of the processor cores.

4. The storage device of claim 3, wherein the instructions are further configured to enable the threads of the apparatus, in response to said execution, to initialize in the shared memory, prior to the breadth-first traversal of the graph, an adjacent vertices array, (ADJ) to store adjacent vertices of the vertices, or a depth and parent values array (DP) to store depth and parent values of the vertices.

5. The storage device of claim 3, wherein the instructions are further configured to enable the threads of the apparatus, in response to said execution, to initialize in the shared memory, prior to the breadth-first traversal of the graph, a plurality of current iteration boundary vertices arrays ($BVC_t$), one per thread, to store boundary vertices being respectively traversed by the threads during a current iteration of the breadth-first traversal, or a plurality of next iteration boundary vertices arrays ($BVN_t$), one per thread, to store boundary vertices to be traversed by the threads during a next iteration of the breadth-first traversal.

6. The storage device of claim 3, wherein the plurality of processor cores are distributed on a number (NS) of sockets, and the LLC are correspondingly associated with the sockets, and the instructions are further configured to enable the threads of the apparatus, in response to said execution, to assign vertices of the graph to the thread(s) of the different sockets.

7. The storage device of claim 6, wherein the instructions are further configured to enable the threads of the apparatus, in response to said execution, to determine, prior to the breadth-first traversal of the graph, a number (npbv) of potential boundary vertices arrays ($PBV_{t,j}$) to be initialized, for each thread, and to initialize in the shared memory, on determination, the $PBV_{t,j}$, wherein the $PBV_{t,j}$ are to be used to store and bin potential boundary vertices during an iteration of the breadth-first traversal, determination of npbv is based at least in part on NS and the partition of the VIS, and j is an integer between 1 and npbv.

8. The storage device of claim 1, wherein the instructions are configured to enable the threads of the apparatus, in response to said execution, to perform, as part of the breadth-first traversal, respective retrieval of neighbor vertices of a plurality of boundary vertices of a current iteration, with each thread retrieve neighbor vertices of a corresponding set of boundary vertices;

respective generation of a plurality of potential boundary vertices arrays, based at least in part on the retrieved vertices;

respective retrieval of parent vertices for vertices in the potential boundary vertices arrays, respectively responsible by the threads; and respective update of depth and parent values in a depth and parent value array for vertices visited, using lock-and-atomic free operations, including update of the VIS sub-arrays, and respective addition of boundary vertices in corresponding sets of boundary vertices for a next iteration.

9. The storage device of claim 8, wherein subsets of the plurality of boundary vertices of a current iteration are respectively stored in a plurality of current iteration boundary vertices arrays ($BVC_t$) correspondingly associated with the threads, and subsets of the plurality of boundary vertices of a next iteration are initially stored in a plurality of next iteration boundary vertices arrays ($BVN_t$) correspondingly associated with the threads, and wherein the instructions are further configured to enable the threads of the apparatus, in response to said execution, to determine, at an end of a iteration, whether the corresponding ($BVN_t$) are empty.

10. The storage device of claim 9, wherein the instructions are further configured to enable the threads of the apparatus, in response to said execution, to swap, by a thread, the $BVC_t$ and the $BVN_t$ of the thread, if at least one of $BVN_t$ the threads is determined to be non-empty, and after the swapping, entry into the next iteration.

11. The storage device of claim 10, wherein the instructions are further configured to enable the threads of the apparatus, in response to said execution, to repeat by the threads, with the entered next iteration becoming a new current iteration, the retrieval of neighboring vertices, the generation, the retrieval of parent vertices, and the update and addition.

12. A computer-implemented method comprising:

partitioning, by one or more of a plurality of threads, a vertices visited array (VIS) into a plurality VIS sub-arrays, wherein the VIS sub-arrays are to be employed by the threads to track visited vertices of a graph to be cooperatively breadth-first traversed by the threads, wherein the threads are operated by a plurality of processor cores associated with one or more last level caches (LLC) having respective cache size(s) employed to selectively cache the VIS sub-arrays during traversal of the graph; and wherein the VIS sub-arrays have sub-array sizes that are smaller than the cache sizes of the LLC the VIS sub-arrays are cached by respective amount(s) to reduce likelihood of eviction of any of the VIS sub-arrays from the LLC during traversal of the graph; and after the partitioning, breadth-first traversing the graph, by the plurality of threads, with the plurality of threads successively traversing different breadth spans of the graph in a plurality of iterations, one breadth span during each iteration, and the plurality of threads traversing different portions of a breadth span of the graph in parallel, respectively using different ones of the VIS sub-arrays, and lock-and-atomic free operations to update depth and parent values of the vertices of the different portions visited.

13. The method of claim 12, wherein partitioning comprise partitioning, by one or more of the plurality of threads, the VIS array into a plurality of VIS sub-arrays where the sub-array sizes are respectively less than half of the cache sizes of the LLC.

14. The method of claim 13, wherein the LLC have the same cache size, and wherein the sub-arrays have the same sub-array size.

15. The method of claim 12, wherein partitioning further comprises initializing, by one or more of the threads, the VIS sub-arrays in a shared memory of the processor cores.

16. The method of claim 15, wherein initializing the VIS sub-arrays comprises initializing one VIS sub-array ($VIS_t$) for each thread.

17. The method of claim 15 further comprising, prior to the breadth-first traversal of the graph, initializing in the shared memory, by one or more of the plurality of threads, an adjacent vertices array (ADJ) to store adjacent vertices of the vertices of the graph, or a depth and parent values array (DP) to store depth and parent values of the vertices of the graph.

18. The method of claim 15 further comprising, prior to the breadth-first traversal of the graph, initializing in the shared memory, by one or more of the plurality of threads, a plurality of current iteration boundary vertices arrays ($BVC_t$), one per thread, to store boundary vertices being respectively traversed by the threads during a current iteration of the breadth-first traversal, or a plurality of next iteration boundary vertices arrays ($BVN_t$), one per thread, to store boundary vertices to be traversed by the threads during a next iteration of the breadth-first traversal.

19. The method of claim 15, wherein the plurality of processor cores are distributed on a number (NS) of sockets, and the LLC are correspondingly associated with the sockets, and the method further comprises assigning, by one or more of the plurality of threads, vertices of the graph to the thread(s) of the different sockets.

20. The method of claim 19 further comprising, prior to the breadth-first traversal of the graph, determining, by one or more of the plurality of threads, a number (npbv) of potential boundary vertices arrays ($PBV_{t,j}$) to be initialized, for each thread, and initializing in the shared memory, by one or more of the plurality of threads, the $PBV_{t,j}$, wherein the $PBV_{t,j}$ are to be used to store and bin potential boundary vertices being visited during an iteration of the breadth-first traversal, determining of npbv is based at least in part on NS and the partitioning of the VIS, and j is an integer between 1 and npbv.

21. The method of claim 12, wherein bread-first traversal comprises:

retrieving respectively, by the threads, neighbor vertices of a plurality of boundary vertices of a current iteration, with each thread retrieving neighbor vertices of a corresponding set of boundary vertices;

generating respectively, by the plurality of threads, a plurality of potential boundary vertices arrays, based at least in part on the corresponding retrieved neighbor vertices;

retrieving respectively, by the plurality of threads, parent vertices for vertices in the potential boundary vertices arrays, respectively responsible by the threads; and updating respectively, by the plurality of threads, depth and parent values in a depth and parent value array for vertices of the graph respectively visited, using lock-and-atomic free operations, including updating the corresponding VIS sub-arrays, and respectively adding, by the plurality of threads, boundary vertices in corresponding sets of boundary vertices for a next iteration, based at least in part on the corresponding potential boundary vertices.

22. The method of claim 21, wherein subsets of the plurality of boundary vertices of a current iteration are respectively stored in a plurality of current iteration boundary vertices arrays ($BVC_t$) correspondingly associated with the threads, and subsets of the plurality of boundary vertices of a next iteration are initially stored in a plurality of next iteration boundary vertices arrays ($BVN_t$) correspondingly associated with the threads, and wherein the method further comprises at an end of a iteration, determining respectively, by the threads, whether the corresponding ($BVN_t$) are empty.

23. The method of claim 22, further comprises swapping, by the threads, the $BVC_t$ and the $BVN_t$ of the thread, if at least one $BVN_t$ of the threads is determined to be non-empty, and after the swapping, entering the next iteration.

24. The method of claim 23, further comprises on entry into the next iteration, with the previous next iteration becoming a new current iteration, repeating, by the threads, the retrieving of neighboring vertices, the generating, the retrieving of parent vertices, and the updating and adding.

25. An apparatus comprising:
a shared memory;
a number (NS) of sockets coupled to the shared memory; and
a plurality of processor cores distributed in the sockets, with each socket having multiple processor cores;
wherein each processor core includes one or more hardware context configured to execute one or more threads to cooperatively breadth-first traverse a graph having a plurality of vertices;
wherein the breadth-first traversal includes prior to the breadth-first traversal of the graph, determine a number (npbv) of potential boundary vertices arrays ($PBV_{t,j}$) to be initialized, for each thread, and to initialize in the shared memory, on determination, the $PBV_{t,j}$;
wherein the $PBV_{t,j}$ are to be used to store and bin potential boundary vertices during an iteration of the breadth-first traversal, j is an integer between 1 and npbv;
wherein determination of npbv is based at least in part on NS and partition of a vertices visited array (VIS) used to track visited vertices during the breadth-first traversal.

26. The apparatus of claim 25, wherein the bread-first traversal comprises:
respective retrieval of neighbor vertices of a plurality of boundary vertices of a current iteration, with each thread retrieves neighbor vertices of a corresponding set of boundary vertices;

respective generation of a plurality of potential boundary vertices arrays, based at least in part on respective retrieved neighbor vertices;

respective retrieval of parent vertices for vertices in the potential boundary vertices arrays, respectively responsible by the threads; and respective update of depth and parent values in a depth and parent value array for respective vertices visited, using lock-and-atomic free operations, including update of sub-arrays partitioned from the VIS, and addition of boundary vertices in respective sets of boundary vertices for a next iteration.

27. The apparatus of claim 26, wherein subsets of the plurality of boundary vertices of a current iteration are respectively stored in a plurality of current iteration boundary vertices arrays ($BVC_t$) in the shared memory correspondingly associated with the threads, and subsets of the plurality of boundary vertices of a next iteration are initially stored in a plurality of next iteration boundary vertices arrays ($BVN_t$) in the shared memory correspondingly associated with the threads, and wherein bread-first traversal further comprises determination, at an end of a iteration, whether the corresponding ($BVN_t$) are empty.

28. The apparatus of claim 27, wherein bread-first traversal further comprises swapping the $BVC_t$ and the $BVN_t$ of the threads, when at least one of the $BVN_t$ of the threads is determined to be non-empty, and after the swapping, entry into the next iteration.

29. The apparatus of claim 28, wherein bread-first traversal further comprises repetition, by the threads, with the entered next iteration becoming a new current iteration, the retrieval of neighboring vertices, the generation, the retrieval of parent vertices and the update and addition.

30. A system comprising:
an image device;
a shared memory;
a number (NS) of sockets having correspondingly associated last level caches (LLC), coupled to the image device and the shared memory;
a plurality of processor cores distributed in the plurality of sockets; with each socket having multiple processor cores;
wherein each processor core includes one or more hardware context configured to execute one or more threads to cooperatively breadth-first traverse associated with an application associated with operation of the image device or operation on image data of the image device, wherein the breadth-first traversal includes prior to the breadth-first traversal of the graph,
partition of a vertices visited array (VIS) into a plurality of VIS sub-arrays, wherein the VIS is to be employed by the threads to track visited vertices of the graph during the breadth-first traversal, wherein the LLC have respective cache size(s) and the VIS sub-arrays have sub-array sizes that are smaller than the cache sizes of the LLC the VIS sub-arrays are cached by respective amount(s) to reduce likelihood of eviction of any of the VIS sub-arrays from the LLC during traversal of the graph; and determine a number (npbv) of potential boundary vertices arrays ($PBV_{t,j}$) to be initialized, for each thread, and to initialize in the shared memory, on determination, the $PBV_{t,j}$, wherein the $PBV_{t,j}$ are to be used to store and bin potential boundary vertices during an iteration of the breadth-first traversal, j is an integer between 1 and npbv, and determination of npbv is based at least in part on NS and the partition of VIS.

31. The system of claim 30, wherein bread-first traversal comprises:

respective retrieval of neighbor vertices of a plurality of boundary vertices of a current iteration, with each thread retrieve neighbor vertices of a corresponding set of boundary vertices;

respective generation of a plurality of potential boundary vertices arrays, based at least in part on respectively retrieved neighbor vertices;

respective retrieval of parent vertices for vertices in the potential boundary vertices arrays, respectively responsible by the threads; and respective update of depth and parent values of a depth and parent value array for vertices visited, using lock-and-atomic free operations, including update of the VIS sub-arrays, and addition of boundary vertices in corresponding sets of boundary vertices for a next iteration.

32. The system of claim 31, wherein subsets of the plurality of boundary vertices of a current iteration are respectively stored in a plurality of current iteration boundary vertices arrays ($BVC_t$) in the shared memory correspondingly associated with the threads, and subsets of the plurality of boundary vertices of a next iteration are initially stored in a plurality of next iteration boundary vertices arrays ($BVN_t$) in the shared memory correspondingly associated with the threads, and wherein bread-first traversal further comprises determination, at an end of a iteration, whether the corresponding ($BVN_t$) are empty.

33. The system of claim 32, wherein bread-first traversal further comprises swapping the $BVC_t$ and the $BVN_t$ of the threads, when at least one of the $BVN_t$ of the threads is determined to be non-empty, and after the swapping, entry into the next iteration.

34. The system of claim 33, wherein bread-first traversal further comprises repetition, by the threads, with the entered next iteration becoming a new current iteration, the retrieval of neighboring vertices, the generation, the retrieval of parent vertices and the update and addition.

35. The system of claim 30, wherein the image device is a selected one of a camera or a video rendering device configured to be coupled to a video camera or a remote video server.

* * * * *

UNITED STATES PATENT AND TRADEMARK OFFICE
CERTIFICATE OF CORRECTION

PATENT NO. : 8,533,432 B2  
APPLICATION NO. : 13/629087  
DATED : September 10, 2013  
INVENTOR(S) : Nadathur Rajagopalan Satish Page 1 of 2

It is certified that error appears in the above-identified patent and that said Letters Patent is hereby corrected as shown below:

In the claims

Column 9  
Lines 24, "are smaller than the cache sizes of the LLC the VIS" should read - are smaller than the cache sizes of the LLC and the VIS  
Line 50, "...array,..." should read - ...array...

Column 10  
Line 44, "...a iteration," should read - ...an iteration,

Column 11  
Lines 1-4, "and wherein the VIS sub-arrays have sub-array sizes that are smaller than the cache sizes of the LLC the VIS sub-arrays are cached by respective amount(s)..." should read - and wherein the VIS sub-arrays have sub-array sizes that are smaller than the cache sizes of the LLC and the VIS sub-arrays are cached by respective amount(s)...  
Line 18, "...partitioning comprise..." should read - ... partitioning comprises...  
Line 64, "...bread-first..." should read - breadth-first...

Column 12  
Line 27, "...a iteration..." should read - ... an iteration...  
Line 62, "...bread-first" should read - breadth-first  
Lines 65-66, "with each thread retrieves.." should read - with each thread retrieving...

Column 13  
Line 21, "...bread-first" should read - breadth-first...  
Line 22, "...a iteration,..." should read - ... an iteration,...  
Line 24, "...bread-first" should read - breadth-first...  
Line 29, "...bread-first" should read - breadth-first Signed and Sealed this  
Twelfth Day of April, 2016

Michelle K. Lee  
*Director of the United States Patent and Trademark Office*

CERTIFICATE OF CORRECTION (continued)
U.S. Pat. No. 8,533,432 B2

In the claims

Column 14
Line 1, "than the cache sizes of the LLC the VIS sub arrays" should read - than the cache sizes of the LLC and the VIS sub arrays
Line 15, "...bread-first" should read - breadth-first...
Lines 17-18, ", ...with each thread retrieve..." should read - ,...with each thread retrieving
Line 39, "...bread-first" should read - breadth-first...
Line 40, "...a iteration,..." should read - ... an iteration,...
Line 42, "...bread-first..." should read - breadth-first...
Line 47, "...bread-first" should read - breadth-first...